United States Patent
Hick (10) Patent No.: US 10,534,336 B2
(45) Date of Patent: *Jan. 14, 2020

(54) SYSTEM AND METHOD FOR OCCUPANCY SENSING USING ADJUSTABLE DETECTION AND LOAD CONTROL PROFILE

(71) Applicant: Leviton Manufacturing Co., Inc., Melville, NY (US)

(72) Inventor: Robert L. Hick, Newberg, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/854,865

(22) Filed: Dec. 27, 2017

(65) Prior Publication Data
US 2018/0136620 A1    May 17, 2018

Related U.S. Application Data (63) Continuation of application No. 14/530,891, filed on Nov. 3, 2014, now Pat. No. 9,880,534.

(51) Int. Cl.
G05B 15/02    (2006.01)
H05B 37/02    (2006.01)

(52) U.S. Cl.
CPC ............. *G05B 15/02* (2013.01); *H05B 37/02* (2013.01)

(58) Field of Classification Search
CPC .................................................... G05B 15/02
USPC ................................................. 700/275–306
See application file for complete search history.

(56) References Cited

U.S. PATENT DOCUMENTS

| 5,699,243 A | 12/1997 | Eckel et al. |
| 5,810,392 A | 9/1998 | Gagnon |
| 5,971,597 A * | 10/1999 | Baldwin ............... G01K 1/16 340/540 |
| 6,151,529 A | 11/2000 | Batko |
| 6,798,341 B1 | 9/2004 | Eckel et al. |

(Continued)

OTHER PUBLICATIONS

Guo, X., et al. "The performance of occupancy-based lighting control systems: A review." Lighting Research & Technology 42.4 (2010): pp. 415-431. (Year: 2010).*

Candanedo, Luis M., and Véronique Feldheim. "Accurate occupancy detection of an office room from light, temperature, humidity and $CO_2$ measurements using statistical learning nnodels." Energy and Buildings 112 (2016): pp. 28-39. (Year: 2016).*

(Continued)

*Primary Examiner* — Satish Rampuria (57) ABSTRACT

An occupancy sensor is disclosed including a passive infrared (PIR) sensing element, a temperature sensing element, and a processor. The processor receives temperature signals from the temperature sensing element and configures the occupancy sensor into a selected operating mode based the received temperature signal. The operating mode may be associated with a predetermined sensing threshold of the PIR sensing element. The processor controls an associated load based on the selected operating mode and the received occupancy signals. The occupancy sensor can alternatively include an occupancy sensing element and a photodetector. Based on the amount of light detected by the photodetector over time, the occupancy sensor can calculate a rough estimate of time of day, and can automatically adjust one or more sensing and/or operational characteristics based on that time of day determination. A photosensor may implement daylight harvesting based on different light levels associated with different times of day.

19 Claims, 5 Drawing Sheets

(56) References Cited

U.S. PATENT DOCUMENTS

| | | | |
|---|---|---|---|
| 7,053,759 B2 | 5/2006 | Kennedy | |
| 7,941,245 B1* | 5/2011 | Popat | E06B 9/68 135/155 |
| 8,665,090 B2 | 3/2014 | Bull | |
| 9,271,375 B2 | 2/2016 | Balasubramanian et al. | |
| 2009/0278479 A1 | 11/2009 | Platner | |
| 2012/0025717 A1 | 2/2012 | Klusman et al. | |
| 2012/0143357 A1 | 6/2012 | Chemel et al. | |
| 2014/0031993 A1* | 1/2014 | Matsuoka | G05D 23/1917 700/276 |
| 2015/0134136 A1* | 5/2015 | Lydecker | H05B 37/0227 700/295 |
| 2016/0195856 A1* | 7/2016 | Spero | G06N 5/046 700/90 |
| 2017/0105268 A1 | 4/2017 | Balasubramanian et al. | |

OTHER PUBLICATIONS

Dodier, Robert H., et al. "Building occupancy detection through sensor belief networks." Energy and buildings 38.9 (2006): pp. 1033-1043. (Year: 2006).*

Elfes, Alberto. "Using occupancy grids for mobile robot perception and navigation." Computer 22.6 (1989): pp. 46-57.

Dong, Bing, et al. "An information technology enabled sustainability test-bed (ITEST) for occupancy detection through an environmental sensing network." Energy and Buildings 42.7 (2010): pp. 1038-1046.

George, Boby, et al. "A combined inductive-capacitive proximity sensor and its application to seat occupancy sensing." Instrumentation and Measurement Technology Conference, 2009. I2MTC'09. IEEE. IEEE, 2009. pp. 1-5.

Bank, Dirk. "A novel ultrasonic sensing system for autonomous mobile systems." IEEE Sensors Journal 2.6 (2002): pp. 597-606.

* cited by examiner

SYSTEM AND METHOD FOR OCCUPANCY SENSING USING ADJUSTABLE DETECTION AND LOAD CONTROL PROFILE

CROSS-REFERENCE TO RELATED APPLICATIONS

This application is a continuation application of pending U.S. patent application Ser. No. 14/530,891, filed Nov. 3, 2014, titled "System and Method for Occupancy Sensing Using Adjustable Detection and Load Control Profile," the entirety of which application is incorporated by reference herein.

FIELD OF THE DISCLOSURE

The present disclosure relates generally to occupancy sensing systems, and more particularly to an improved system and method for occupancy sensing systems having adjustable detection profiles.

BACKGROUND OF THE DISCLOSURE

Occupancy sensors are designed to save energy by detecting the presence of a moving object in an area of coverage and switching a load (e.g., a light source, an HVAC system, etc.) on and off depending upon the presence of the moving object. For example, when motion is detected within the area of coverage, the load is turned on. Alternatively, when motion is not detected within the area of coverage, thus indicating that the area of coverage is not occupied, the load is turned off after a predetermined period of time. Occupancy sensors thus facilitate electrical energy savings by automating the functions of, for example, a light switch.

Occupancy sensors using passive infrared detection (PIR) have been employed in a variety of indoor applications with much success. PIR occupancy sensors operate by sensing a body having a heat signature in excess of background infrared (IR) levels. Since PIR occupancy sensors rely on body heat detection, indoor applications that experience limited temperature extremes are a near perfect environment, and the indoor PIR occupancy sensor can be easily tuned and tailored to identify body heat from the ambient temperature environment.

Although PIR occupancy sensors have also been used in outdoor applications, the ability to accurately detect the temperature produced by a human body or an automobile within a wide range of ambient temperatures is made more difficult. One reason for this, is because as the ambient temperature of a monitored area rises, the difference between human body temperature and the ambient temperature decreases, and as a result PIR occupancy sensors can be less able to differentiate the heat signature of a human body from the background heat signature of the surroundings. In addition, detection problems increase when road or parking surface temperatures rise, making it even more difficult for the PIR occupancy sensor to discern the heat signature of a moving object from the background heat signature of the road or parking surface.

Prior occupancy sensing systems also suffer from deficiencies in that they do not adequately take into account time of day. More particularly, prior outdoor occupancy sensing systems have thus far not had the capability to customize operation based on time of day so as to provide optimum energy savings during periods when low activity is expected.

SUMMARY OF THE DISCLOSURE

In view of the aforementioned issues, an occupancy sensor is disclosed that automatically adjusts its sensitivity and/or other operational characteristics based on at least one sensed environmental factor. In one embodiment, the environmental factor is ambient temperature, while in other embodiments, the environmental factor can be the time of day. In this way the occupancy sensor can maximize its own performance and can optimize operation of a lighting system in response to changing environmental factors.

An occupancy sensor is disclosed, including a passive infrared (PR) sensing element, a temperature sensing element and a processor coupled to the PIR sensing element and the temperature sensing element. The processor may be configured to receive temperature signals from the temperature sensing element and configure the occupancy sensor into a selected one of a plurality of operating modes based on the received temperature signals. The processor may further be configured to receive occupancy signals from the PR sensing element and to control an associated load based on the selected operating mode and the received occupancy signals.

An occupancy sensor is disclosed, including an occupancy sensing element, a photodetector, and a processor coupled to the occupancy sensing element and the photodetector. The processor may be configured to receive light signals from the photodetector and to configure the occupancy sensor into at least one of a plurality of operating modes based on an estimated time of day. The estimated time of day may be determined by the processor based on selected ones of said light signals received from the photodetector. The processor may be configured to receive occupancy signals from the occupancy sensing element and to control an associated load based on the selected operating mode and the received occupancy signals.

A method is disclosed for controlling a load with an occupancy sensor. The method may comprise: at a PIR sensor, identifying an occupied condition of a monitored area and sending an occupancy signal to a processor; at a temperature sensing element, identifying an ambient temperature of the monitored area and sending a temperature signal to the processor representative of said ambient temperature; at the processor, receiving the temperature signal and configuring the occupancy sensor into a selected one of a plurality of operating modes based thereon; and controlling a load associated with the monitored area based on the selected operating mode and the occupancy signal. The selected operating mode may be associated with a predetermined sensing threshold associated with the PIR sensor.

A method is disclosed for controlling a load with an occupancy sensor. The method may include: at an occupancy sensing element, identifying an occupied condition of a monitored area and sending an occupancy signal to a processor; at a photodetector, identifying an ambient light level of the monitored area and sending a light signal to the processor representative of said ambient light level; at the processor, receiving the light signals from the photodetector and configuring the occupancy sensor into at least one of a plurality of operating modes based on an estimated time of day, the estimated time of day determined by the processor based on selected ones of said light signals received from the photodetector; and controlling a load associated with the monitored area based on the selected operating mode and the occupancy signal.

BRIEF DESCRIPTION OF THE DRAWINGS

By way of example, a specific embodiment of the disclosed device will now be described, with reference to the accompanying drawings, in which.

DETAILED DESCRIPTION

The disclosed system and method may find use in lighting control systems, which, in some embodiments, are outdoor lighting control systems. In exemplary embodiments, a PIR occupancy sensor can be fine-tuned for best performance by modifying the pre-processing and/or post-processing of a signal from a PR sensing element in response to changes in ambient temperature. In other embodiments, an occupancy sensor can sense changes in daylight that occur near sunset and sunrise in order to estimate a close approximation of time of day, and can use this estimation to vary operational parameters of the occupancy sensor. Non-limiting examples of operational parameters include, but are not limited to, time delay before turning off an associated load and sensitivity adjustment thresholds.

Figure 1:
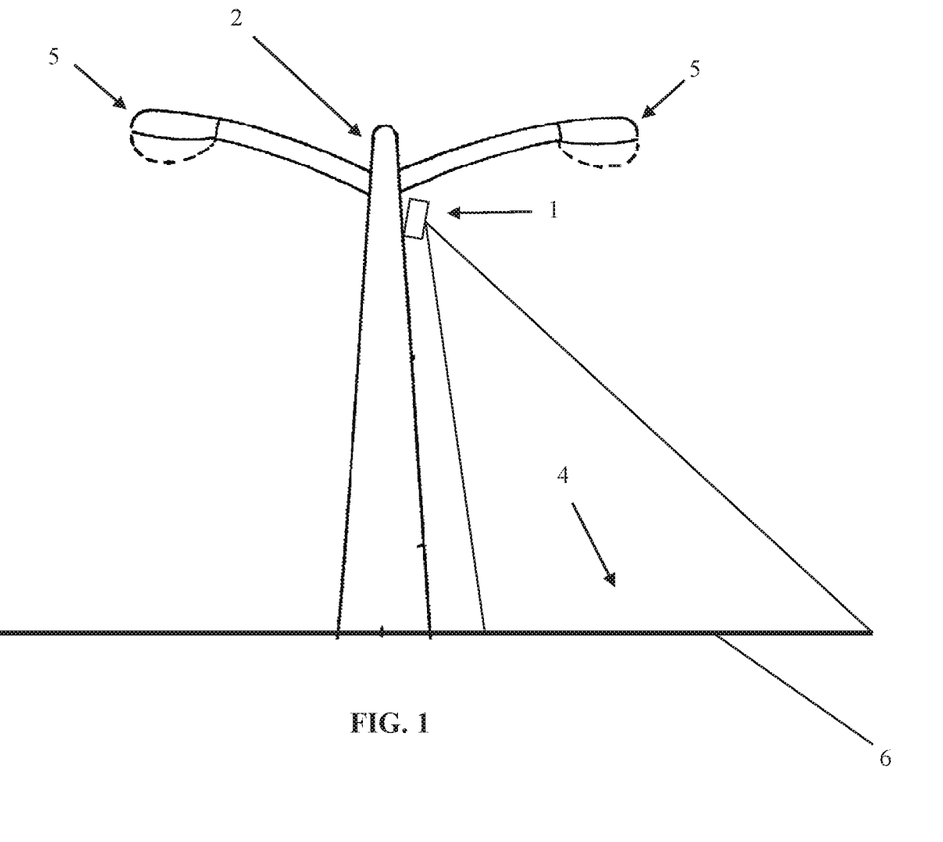
FIG. 1 is a schematic diagram of an exemplary occupancy sensing system positioned to monitor an outdoor area.

FIG. 1 shows an exemplary outdoor application in which an occupancy sensor 1 is mounted on an upper region of a light pole 2 so that the sensor can monitor a portion 4 of a parking lot 6 illuminated by one or more lights 5. Although a single occupancy sensor 1 is illustrated, it will be appreciated that multiple occupancy sensors 1 can be used in actual application to cover an entire monitored area, such as a large parking lot. In addition, although the description will generally proceed in relation to an occupancy sensor 1 having a PIR based sensing element, it will be appreciated that one or more of the disclosed embodiments can alternatively or additionally include other types of sensing elements now or hereinafter known, such as radio frequency (RF), ultrasonic, audio, video and the like as well as combinations thereof.

It will also be appreciated that the disclosed occupancy sensor 1 is not limited to light pole installations, and thus the occupancy sensor 1 may be mounted on any of a variety of surfaces including walls and ceilings. Examples of appropriate mounting arrangements include wall-mounting with the occupancy sensor positioned to monitor alleys, driveways, enclosed courtyards, and the like. Ceiling mounting arrangements can also be used, for example, in outdoor parking garage applications.

Figure 2:
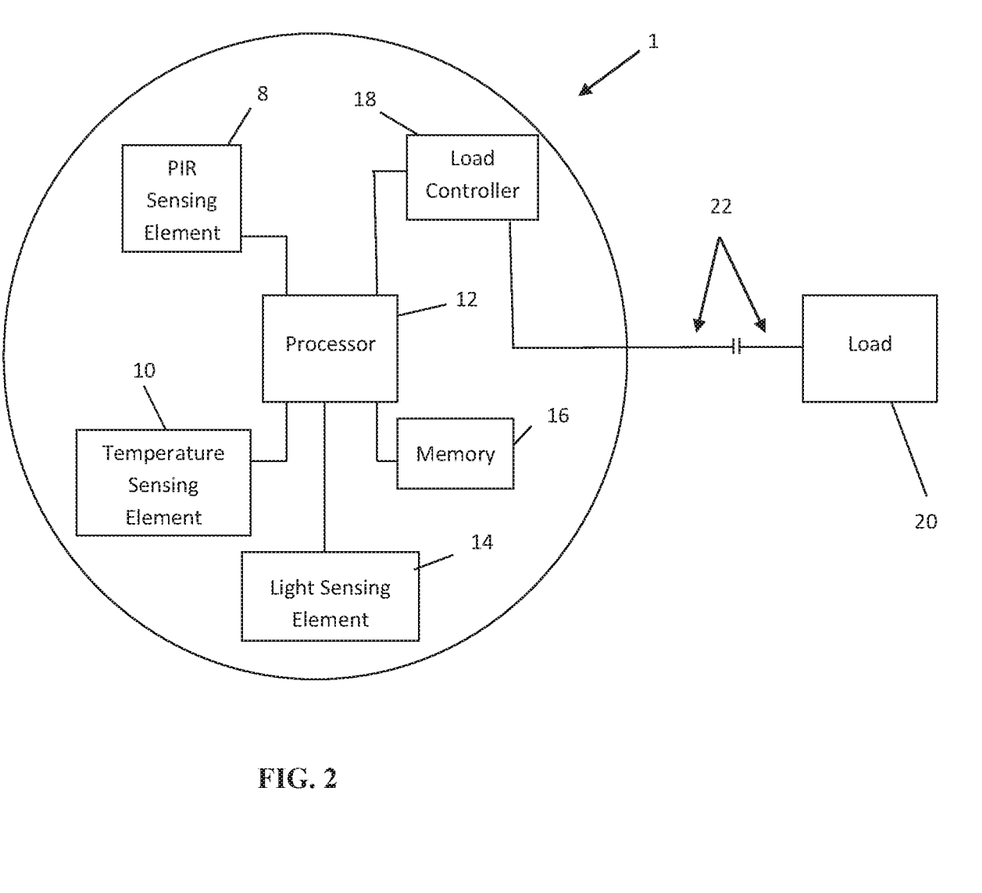
FIG. 2 is a schematic of an occupancy sensor according to the disclosure.

Referring now to FIG. 2, the occupancy sensor 1 may include a passive infrared (PIR) sensing element 8, a temperature sensing element 10, memory 16, a load controller 18, and a processor 12. In addition, the occupancy sensor 1 may include a photodetector 14. The memory 16 may be associated with the processor 12 for storing instructions, look up tables, operational history data and the like. The memory 16 may be any of a variety of volatile or non-volatile memory devices now or hereinafter known by those of ordinary skill in the art. The load controller 18 may be operatively coupled to one or more loads 20 such as the lights 5 illustrated in FIG. 1. Based on information provided to the processor 12 from the PIR sensing element 8, the processor 12 may instruct the load controller 18 to energize the one or more loads 20. The processor 12 may also command the load controller 18 to de-energize the one or more loads 20 a predetermined amount of time after occupancy within the area of coverage is no longer detected.

Although the illustrated embodiment shows all of the operative elements (PIR sensing element 8, temperature sensing element 10, et al.) as being internal to the occupancy sensor 1, it will be appreciated that some or all of these operative elements can be located external to and/or separate from the occupancy sensor. For example, such an arrangement may be appropriate when using an analog PIR sensing element 8. In such cases, the temperature sensing element 10 may be any appropriate temperature sensing device such as a thermocouple, a resistance temperature detector (RTD), a thermistor, or the like. When using a digital PIR sensing element 8, however, the digital PIR sensor itself may provide the desired temperature data for use by the processor 12, and thus a discrete temperature sensing element 10 may not be required. It will also be appreciated that the disclosed load controller 18 may or may not be incorporated into the housing of the occupancy sensor 1. For example, the occupancy sensor 1 may be a low-voltage occupancy sensor that works in combination with a power pack, as will be readily appreciated by one of ordinary skill in the art.

The photodetector 14 may employ any of a variety of appropriate light sensing technologies, including active pixel sensors, photoresistors, charge coupled devices, and the like. The load controller 18 may be a relay or other arrangement or device appropriate for controlling the energizing and de-energizing of the associated load 20. In the illustrated embodiment, the load controller 18 may communicate with the external load 20 along a wired or wireless communications channel 22.

In some embodiments, the sensor 1 may be coupled to a private or public network to allow occupancy information to be transferred to a remote computer and/or facility. In some embodiments, occupancy information may be sent via the Internet to a web page to enable remote monitoring of the associated area. A building manager, lot manager, or other authorized individual or agency may monitor this information to enable easy access to occupancy data. Communication between the sensor 1 and the building manager (or other user) via a private or public network or direct connection can be via any of a variety of appropriate hard-wired or wireless connections.

As previously noted, in some embodiments the occupancy sensor 1 can be fine-tuned for best performance by modifying pre-processing and/or post-processing of the signal from the MR sensing element 8 in response to environmental changes in ambient temperature and/or daylight sensed by the temperature sensing element 10 and/or the photodetector 14. Thus, the occupancy sensor 1 may have one or more operating profiles corresponding to different sensed environmental conditions.

For example, based on temperature information provided by the temperature sensing element 10, the processor 12 can adjust a sensing threshold required to transmit a detection signal to the load controller 18. As will be understood, PR occupancy sensors operate by sensing an object having a heat signature in excess of background infrared (IR) levels. That is, PIR sensors observe a difference in temperature between the object and the background and they register that as a change. Depending on the magnitude of this change, logic built into the PIR occupancy sensor 1 either ignores the change if it is below a certain threshold, or causes a detection signal to be issued if the change is above the threshold required to signify an occupied condition. As the ambient temperature of a monitored area rises, the difference between the object (human body, vehicle, etc.) temperature and the ambient temperature decreases, and as a result PIR occupancy sensors can be less able to differentiate the heat of an object from the heat of the surroundings. As previously noted, this problem may be particularly acute where the occupancy sensor is deployed in a hot climate where the temperature of the monitored area can be very high.

In one non-limiting exemplary embodiment, the processor 12 can use information from the temperature sensing element 10 to adjust a sensing threshold so that a greater or lesser temperature differential between the monitored area and a sensed object must be exceeded before an occupied condition is signaled and the load 20 is energized. In one embodiment, as the temperature of the monitored area increases (as sensed by the temperature sensing element 10), the processor 12 decreases the temperature differential required to signal an occupied condition. Different predetermined threshold sensitivities may be associated with different operating modes of the occupancy sensor 1. The occupancy sensor 1 may include a plurality of such modes of operation depending upon the particular environment in which the occupancy sensor is installed.

In addition, other parameters of the occupancy sensor 1, such as time delay, can be modified based on directly sensed conditions (e.g., temperature) or indirectly determined conditions (e.g., time of day). In one non-limiting exemplary embodiment, it may be desirable to increase the time delay before turning off an associated load during periods in which ambient temperature is above a predetermined value, and where temperature sensing of an occupied condition may be less reliable.

In one non-limiting exemplary embodiment, the processor 12 employs an algorithm to adjust this threshold. In other embodiments, adjustment values are provided in a lookup table in the non-volatile memory 16 associated with the processor 12. Adjustment values may alternatively be stored in a look up table associated with the processor 12 in lieu of separate non-volatile memory. In yet another embodiment (not shown), the threshold adjustment may be manually entered via a user input device such as a dip switch, trim pot, rotary switch, touch pad, touch screen, or the like.

In addition, or alternatively, ambient temperature sensed by the temperature sensing element 10 can be used to estimate a time of day, and this estimate can be used to adjust operating parameters of the occupancy sensor. For example, during daylight hours the temperature sensing element 10 can send signals to the processor 12 indicative of a daylight condition. In one embodiment, if the temperature sensing element 10 senses a particular discrete temperature or a predefined upward trend in temperature it may associate that with sunrise. A sensed counter-trend or discrete temperature value may be associated with sunset. Upon receiving a signal (or signals) from the temperature sensing element 10 indicative of daytime, the processor 12 may act to prevent the load controller 18 from energizing the load 20 regardless of whether the PR sensor 8 senses an occupied condition of the monitored area. Such an arrangement may be useful in conserving energy, since it is needless to turn on outdoor lights in the daytime as an indication of the area's occupation status. As will be appreciated, other sensor settings such as sensitivity, and time-delay before turning off an associated load, can be adjusted in a similar manner, as desired.

During twilight, or after it has become dark, the temperature (or temperature trend) sensed by the temperature sensing element 10 may drop below a predetermined threshold, which may be indicative of sunset. Thus, upon receiving such a signal (or signals) from the temperature sensing element 10 the processor 12 may enable the load controller 18 to energize the associated load 20 if the PR sensor 8 senses an occupied condition of the monitored area.

Figure 3:
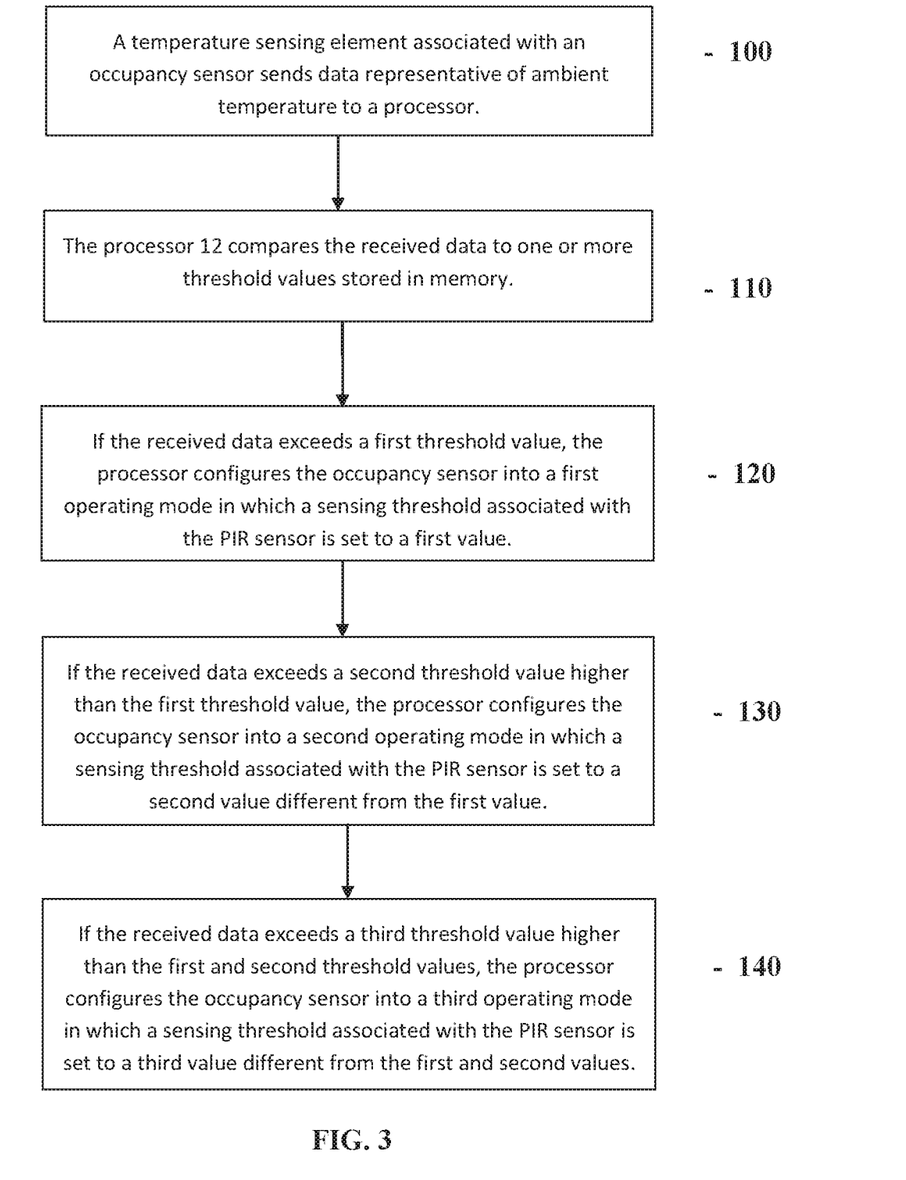
FIG. 3 is a logic diagram illustrating an exemplary embodiment of the disclosed method.

An exemplary method of using the disclosed system 1 will now be described in relation to FIG. 3. At step 100 the temperature sensing element 10 associated with the occupancy sensor 1 may send data representative of ambient temperature to the processor 12. It will be appreciated that this data may be sent substantially continuously, or at longer periodic intervals. At step 110, the processor 12 may compare the received data to one or more threshold values. In one non-limiting exemplary embodiment, the threshold values are stored in memory 16. At step 120, if the received data is determined to exceed a first threshold value, the processor 12 may configure the occupancy sensor 1 into a first operating mode in which a sensing threshold associated with the PIR sensor 8 is set to a first value. In one non-limiting exemplary embodiment, this first threshold value corresponds to an ambient light level associated with a first predetermined time of day. At step 130, if the received data is determined to exceed a second threshold value, which is higher than the first threshold value, the processor 12 may configure the occupancy sensor 1 into a second operating mode in which a sensing threshold associated with the PIR sensor 8 is set to a second value that is different from the first value. In one non-limiting exemplary embodiment, this second threshold value corresponds to an ambient light level associated with a second predetermined time of day which is different from the first predetermined time of day. At step 140, if the received data is determined to exceed a third threshold value which is higher than the first and second threshold values, the processor 12 may configure the occupancy sensor 1 into a third operating mode in which a sensing threshold associated with the PR sensor 8 is set to a third value that is different from the first and second values. In one non-limiting exemplary embodiment, this third threshold value corresponds to an ambient light level associated with a third predetermined time of day which is different from the first and second predetermined times of day. This process can continue depending upon the total number of the threshold values stored in memory (or otherwise associated with the processor 12). This process can run continuously, or it can be repeated at discrete periodic intervals, as desired.

As previously noted, the occupancy sensor 1 may additionally, or alternatively, be configured to sense environmental changes other than temperature, and may change one or more operational characteristics of the occupancy sensor based thereon. For example, the occupancy sensor 1 may sense the time of day, and may automatically adjust operation of the occupancy sensor in response.

As previously noted, in some commercial environments, such as parking lots, time of day performance changes of an occupancy sensor 1 can be highly desirable. For example, immediately after sunset, lighting in the monitored area (e.g., a parking lot) may stay on for 30 minutes after motion is detected for the convenience of the business customers (i.e., so they can walk safely from their car to the store, and vice versa). However, at a later time, say for example, beginning at 10:00 pm through sunrise, the lighting may stay on for only a few minutes (e.g., 5 minutes) after motion is detected to save energy, since few if any customers will be in the parking lot. This short period of illumination is also sufficient for security personnel to detect whether a person is moving through the parking lot.

It can be difficult, however, to maintain a synchronized real time clock in pole or ceiling mounted occupancy sensors 1. Thus, in accordance with the disclosure a rough estimation of the time of day can be determined by the occupancy sensor 1. In one non-limiting exemplary embodiment, this can be achieved by sensing the ambient light level (using the photodetector 14) and identifying changes in daylight that occur near sunset and sunrise to determine an estimation of the midpoint between sunset and sunrise (i.e., midnight). This estimation is expected to be within about one hour (+/−) from actual midnight, and can be used by the occupancy sensor 1 as a baseline for determining an estimated time of day. The estimated time of day can then be used by the processor 12 to vary parameters such as time delay (i.e., the amount of time a load stays energized), sensitivity of the occupancy sensor 1 and the like.

Thus, in one embodiment, the photodetector 14 can monitor the ambient light level, and can send representative signals to the processor 12. The processor 12 can use the signals received from the photodetector 14 to determine an approximate sunrise time and an approximate sunset time, and from that information the processor can determine an estimated midnight value (again, within an acceptable tolerance). From that estimated midnight value, the processor 12 may implement certain operational modes based on the estimated time of day.

The occupancy sensor 1 may thus have at least three operational modes. The first mode may be employed during normal daylight hours, the second mode may be employed for an early portion of the evening hours when it is dark outside but when businesses are still operating, and the third mode may be employed for a later portion of the evening hours when it is dark outside and businesses are no longer operating. As will be appreciated, exterior lighting needs may be different during each of these periods.

Thus, when the photodetector 14 senses light above a predetermined threshold (associated with the daylight hours), the processor 12 may place the occupancy sensor 1 in the first mode. In this first mode the processor 12 may operate to prevent the load controller 18 from energizing the load 20 regardless of whether the PIR sensor 8 detects motion in the monitored area.

When the photodetector 14 senses light below a predetermined threshold (associated with sundown or twilight), the processor 12 may place occupancy sensor 1 in the second mode. In this second mode, the processor 12 may function such that when the PR sensor 8 detects motion in the monitored area, the load controller 18 is commanded to energize the load 20. The load 20 may then be maintained in the energized state for a first predetermined time period, for example 30 minutes after motion is detected. This first predetermined time period may be sufficient that business employees or customers can safely exit the store and walk to their car, and vice versa.

The occupancy sensor 1 can be programmed to enter the third mode when the processor 12 determines that a predetermined hour of day has been reached. As previously noted, this predetermined hour of day can be based on the estimated midnight value. For example, if the user elects to have the occupancy sensor 1 enter the third mode at the predetermined time of 10:00 PM, the processor 12 can be programmed to determine this time as being two hours prior to the estimated midnight value. Thus, when the processor 12 determines the time to be 10:00 PM, the occupancy sensor 1 can be placed in the third mode. In this third mode the processor 12 may function such that when the PIR sensor 8 detects motion in the monitored area, the load controller 18 is commanded to energize the load 20. The load 20 may be maintained in the energized state for a second predetermined time period which is less than the first predetermined time period. In one non-limiting exemplary embodiment, this second predetermined time period can be about 5 minutes. This second predetermined time period can be long enough to enable security personnel to identify the presence of a person or a vehicle in the monitored area, but is not so long that the lights are left on for an excessive amount of time, thus saving energy.

In one embodiment, the desired time of day for entering this third mode, as well as the first and second time periods, can be programmed into the processor 12. Alternatively, these values can be manually entered into the occupancy sensor 1 via a user input device such as a dip switch, trim pot, rotary switch, touch pad, touch screen or the like (not shown).

When the photodetector 14 once again senses light above a predetermined threshold (associated with the daylight hours), the processor 12 may place the occupancy sensor 1 in the first mode. The process can continue from there.

In some embodiments the processor may periodically (e.g., daily) update its estimation of midnight based on light levels sensed by the photodetector 14. In other embodiments this value may be obtained only once, or at another discrete period such as monthly or quarterly.

It will be appreciated that for applications in which multiple individual occupancy sensors 1 are used to monitor an area, each occupancy sensor 1 can have its own arrangement of photodetector 14, processor/circuitry 12, as well as its own programmed behavior. Thus, each occupancy sensor 1 in a group can independently determine time of day, and can modify operation of an associated load 20 based on that determined time of day. Alternatively, where multiple individual occupancy sensors 1 are used to monitor an area, one or more of the occupancy sensors may independently determine time of day, and this information may be populated to the other occupancy sensors in the group.

A non-limiting set of examples of different characteristics that can be imposed during these different operational modes, include changes in sensitivity of the PIR sensor 8 (i.e., to accommodate for changes in ambient temperatures), changes in the processing of the signal from the PIR sensor, filtering the signal from the PIR sensor to look for different types of signatures, and time delay (i.e., time the load remains energized before turning off). For example, as the sensor becomes less reliable (i.e., less able to reliably detect the presence of a human heat signature), the "time on" setting for the associated load may be extended.

Figure 4:
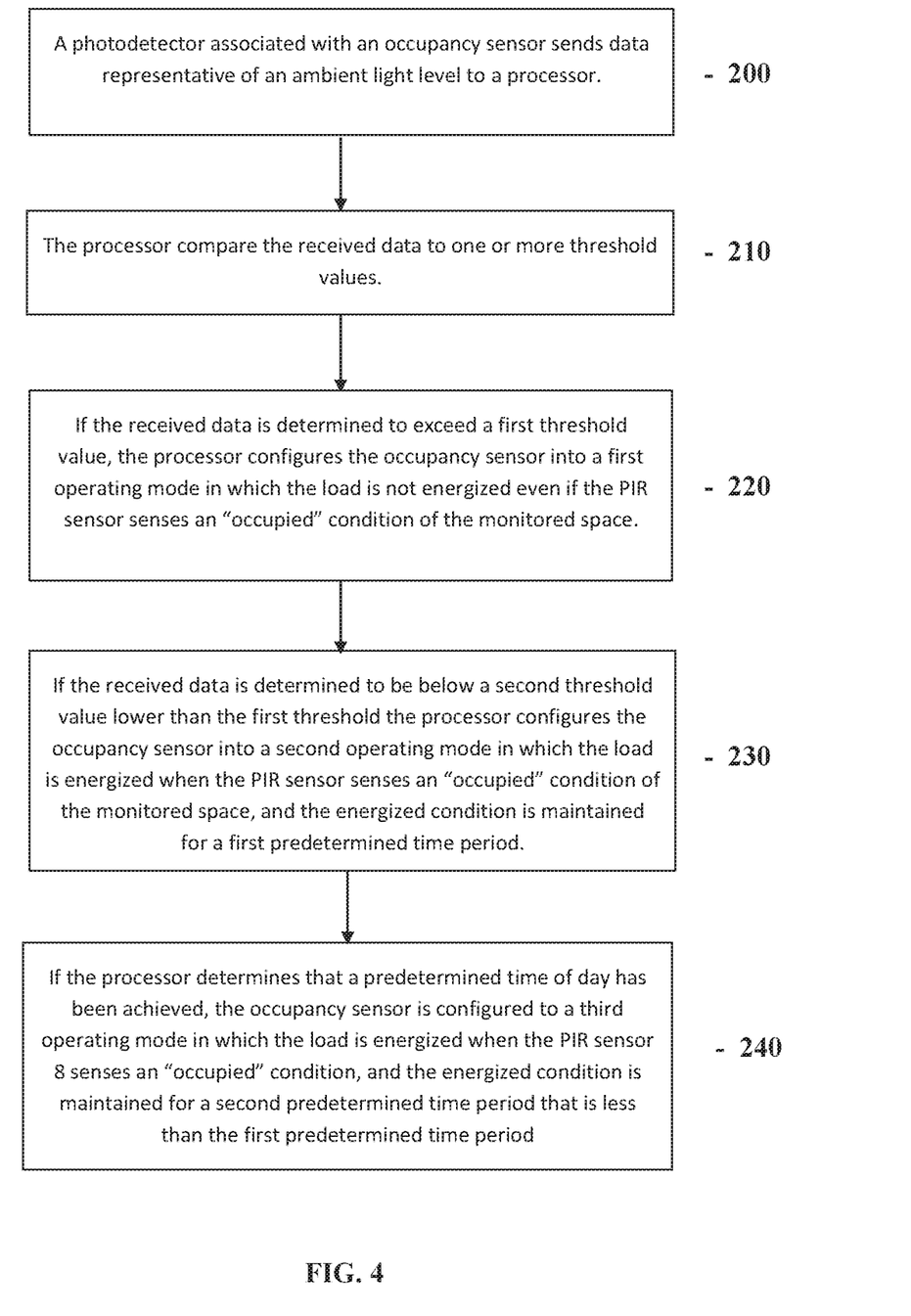
FIG. 4 is a logic diagram illustrating another exemplary embodiment of the disclosed method.

An exemplary method of using the disclosed system 1 will now be described in relation to FIG. 4. At step 200, the photodetector 14 associated with the occupancy sensor 1 sends data representative of an ambient light level to the processor 12. It will be appreciated that this data may be sent substantially continuously, or at longer periodic intervals. At step 210, the processor 12 may compare the received data to one or more threshold values. In one non-limiting exemplary embodiment, the threshold values are stored in memory 16. At step 220, if the received data is determined to exceed a first threshold value, the processor 12 configures the occupancy sensor 1 into a first operating mode in which the load 20 is not energized regardless of whether the PIR sensor 8 senses an "occupied" condition (i.e., one in which the PR sensor senses a body having a heat signature in excess of IR levels) in the monitored area. In one non-limiting exemplary embodiment, this first threshold value corresponds to an ambient light level associated with a first predetermined time of day. At step 230, if the received data is determined to be below a second threshold value, which is lower than the first threshold value, the processor 12 configures the occupancy sensor 1 into a second operating mode in which the load 20 is energized when the PIR sensor 8 senses an "occupied" condition (i.e., one in which the PIR sensor senses a body having a heat signature in excess of IR levels. In one non-limiting exemplary embodiment, the second threshold value corresponds to an ambient light level associated with a second predetermined time of day that is different from the first predetermined time of day. In this second operating mode, the load 20 may be maintained in the energized state for a first predetermined time period. In one non-limiting exemplary embodiment, this first predetermined time period may be about 30 minutes. At step 240, the processor 12 determines that a predetermined time of day has been achieved, and configures the occupancy sensor 1 into a third operating mode in which the load 20 is energized when the PIR sensor 8 senses an "occupied" condition (i.e., one in which the PIR sensor senses a body having a heat signature in excess of IR levels). In this third operating mode, the load 20 may be maintained in the energized state for a second predetermined time period that is less than the first predetermined time period. In one non-limiting exemplary embodiment, this second predetermined time period may be about 5 minutes. At step 250, if the received data is determined to exceed a first threshold value, the processor 12 configures the occupancy sensor 1 back into the first operating mode.

Although the illustrated occupancy sensor 1 includes a discrete processor 12, it will be appreciated that the appropriate logic for implementing the disclosed features of this sensor may also be embodied in appropriate hardwired circuitry. Thus, the logic associated with this embodiment can be in hardware, software, or a combination of the two. It will be appreciated that the term "processor" in this application should be interpreted to be a discrete processor or hardwired circuitry configured to perform the same or similar function.

Some of the inventive principles of the disclosure relate to techniques for occupancy sensing, in particular, for sensing the presence or motion of a person or a moving object in an area of interest. In one embodiment, lighting levels can be adjusted in or about the area of interest responsive to sensing the person or moving object. In another embodiment, a security alarm can be triggered responsive to sensing the person or moving object.

Figure 5:
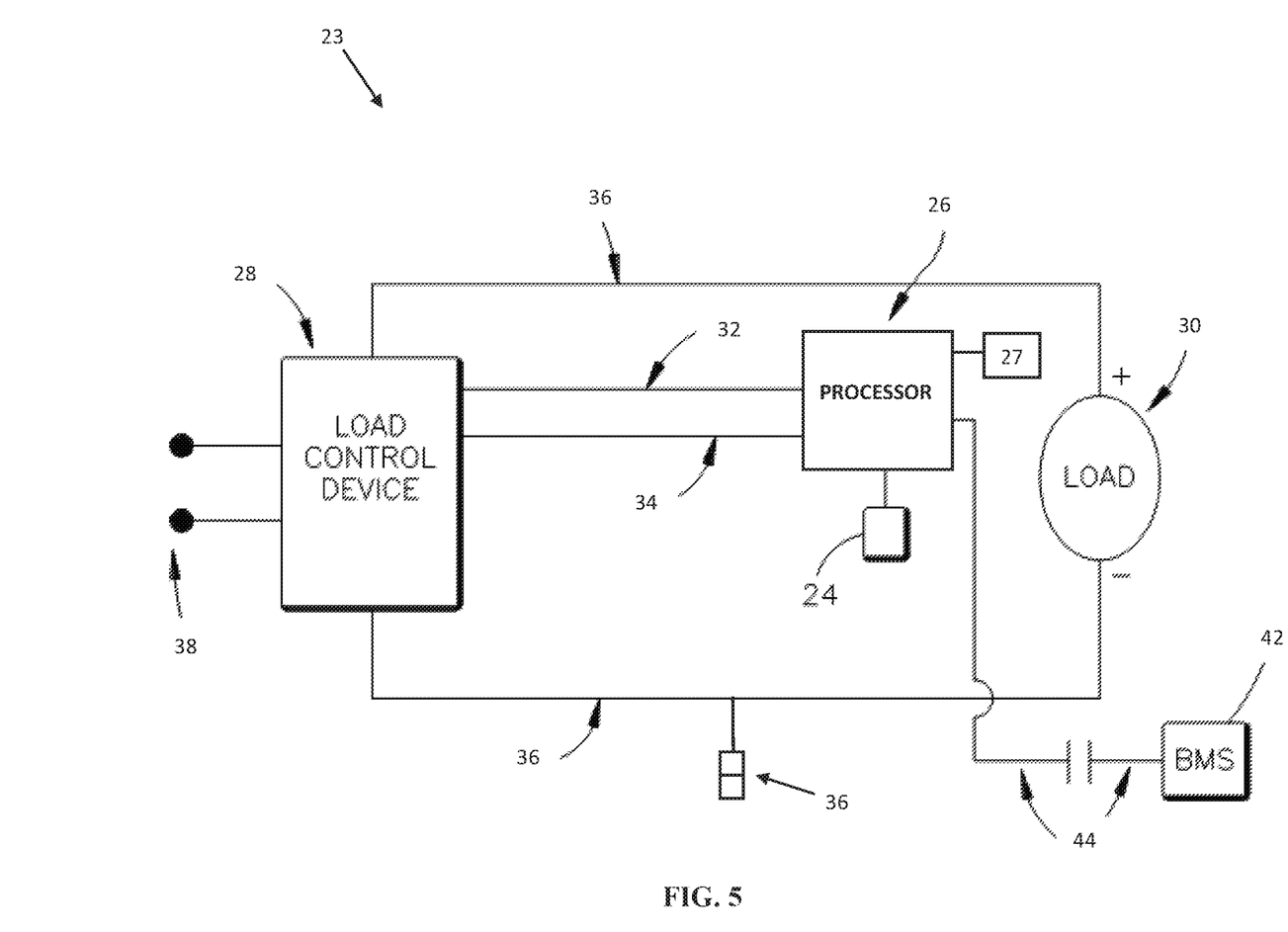
FIG. 5 is a schematic of a daylighting system for monitoring an indoor or outdoor area.

Referring now to FIG. 5, an embodiment will be described in which a photodetector can be employed to implement a variable daylighting feature in which lighting levels are adjusted in a monitored area depending upon the time of day. Photodetectors can be used to monitor task or ambient light levels in a monitored area as part of an energy management system. Thus, the brightness of powered lights in a particular area can be adjusted so that a total amount of light (i.e., natural light plus powered light) in an occupied area meets one or more user-defined levels. In one embodiment, if the photodetector detects a light level in the area to be less than a user defined minimum, then the powered lights can be brightened to increase the light level to the desired minimum value. Likewise, if the photodetector detects a light level in the area to be greater than the user defined minimum, then the powered lights can be dimmed to decrease the light level to the desired minimum value. Energy savings can be achieved using this scheme. For example, it may be desirable to have a lower target light level value for "daylighting" during after-hours as compared to working hours. Such an arrangement can save more energy than prior systems that include a single target light level value that is applied to an entire 24 hour period. The disclosed system and method may utilize different photocell target lighting levels based on time of day, day of the week, or other criteria to achieve this desired energy savings.

Photodetectors can be suitable for installation in rooms with windows and open areas receiving substantial ambient light. They may also be employed in a variety of outdoor working environments. In application, one or more photodetectors can be connected to a load control device that can control operation of one or more associated loads (e.g., lights) in response to detected light levels. The load control device can control the loads using on/off signaling, dimming and the like.

In some embodiments the photodetector can measure ambient light in a specified area, and can send signals representative of light level to the load control device which, in turn, can adjust the loads (e.g., lighting fixtures) to maintain a constant lighting level in the monitored area. As mentioned, in some embodiments, this can cause the lights in the monitored area (with windows, skylights or other sources of ambient light) to automatically brighten or dim depending on how much light the photodetector detects. The desired constant lighting level can be programmed into a processor associated with the load control device, and thereafter the load control device can receive the photodetector's real-time light measurement (or a signal representative thereof) and can adjust the associated lighting load(s) to maintain a steady lighting level within the monitored area.

As will be described in greater detail later, if the measured light level in a specified area is determined by the photodetector (or processor) to be equal to a predetermined user-defined light level, then the lighting loads serving the specified area are controlled to remain at a constant lighting level. By contrast, if the measured light level is determined to be less than the predetermined user-defined light level, then the lighting loads can be controlled to brighten until the measured light level equals the predetermined user-defined light level. Finally, if the measured light level is determined to be greater than the predetermined user-defined light level, then the loads may be dimmed until the measured light level equals the predetermined user-defined light level.

FIG. 5 illustrates a system 23 including an exemplary photodetector 24 coupled to a processor 26 and a load control device 28. The load control device 28 can, in turn, can be coupled to one or more loads 30, such as lighting fixtures. It will be appreciated that although it is shown as a separate element, the processor 26 may instead be integral to the photodetector 24 or the load control device 28, or it may be part of an associated occupancy sensor (not shown). It will also be appreciated that although the photodetector 24 is shown as a stand-alone element, it can, in some embodiments, be provided in conjunction with, or as part of, an occupancy sensor such as the occupancy sensor 1 disclosed in relation to the previous embodiments.

The load control device 28 can include appropriate dimming circuitry to facilitate dimming of one or more of the connected loads 30 in response to commands received from the processor 26.

The photodetector and processor may receive power from the load control device 28 via a power line 32, and may transmit load control signals to the load control device 28 via a signal line 34. In response to signals received from the photodetector 24, the load control device 28 may adjust power supplied to the load 30 via one or more power lines 36. In one embodiment, the load 30 may include at least one light. The load control device 28 may receive line power from a building power source 38. A wall switch 40 may further be provided to control an on/off status of the load 30.

In addition, the processor 26 may have a connection to a building management system (BMS) 42 via a wireless or hardwired communications link 44. The building management system 42 may be used to monitor status and operation of the system 23 by building personnel. The BMS 42 may also be used to remotely reconfigure the target light levels of the system 23.

In one embodiment, the photodetector 24 may be configured to send a signal to the processor 26 when a light level that is above or below the predetermined threshold is sensed. In another embodiment, the photodetector 24 may continuously sends light level signals to the processor 26, and the processor 26 may determine if the sensed light level is above or below the predetermined threshold.

Although the illustrated embodiments include a single photodetector 24, a single load control device 28, and a single load 30, it will be appreciated by those of ordinary skill in the art that any number of sensors, loads and/or load control devices may be used in combination to provide a lighting control system having a desired functionality and coverage.

As noted, the photodetector 24 may be operable to sense an ambient lighting level in a monitored area and to provide an associated lighting level signal to the processor 26. Based on this lighting level signal, the processor 26 may command the load control device 28 to adjust the brightness of one or more of the connected loads 30. In one embodiment, a plurality of predetermined ambient lighting levels may be stored in non-volatile memory 27 associated with the processor 26, and the processor may compare the lighting level signal from the photodetector 24 to determine if the measured ambient light level in the monitored area is at or above a predetermined level. The memory 27 may be any of a variety of volatile or non-volatile memory devices now or hereinafter known by those of ordinary skill in the art. In some embodiments, the system of FIG. 5 can be implemented with an occupancy sensor such as, but not limited to, the occupancy sensor 1 disclosed in relation to the previous embodiments.

In an exemplary embodiment, the system of FIG. 5 may be used to implement lighting control for an area using a plurality of different target lighting levels, where the plurality of different target lighting levels are associated with particular times of day and/or days of the week. For example, a first predetermined target lighting level may be associated with the time range of from 8:00 AM to 5:00 PM. A second predetermined target lighting level may be associated with a time range of from 5:00 PM to 6:00 PM (i.e., after normal working hours, but before the area is vacated). Thus, the second predetermined target lighting level may be lower than the first predetermined target lighting level. A third predetermined target lighting level may be associated with a time range of from 6:00 PM to 8:00 AM (i.e., when the area is expected to be unoccupied). Thus, the third predetermined target lighting level may be lower than the first and second predetermined target lighting levels. Fewer or greater numbers of such levels may be used. In addition, the levels may be modified based on the day of the week, holidays, planned business closures, and the like.

In non-limiting exemplary embodiments, the first predetermined target lighting level for a warehouse environment can be about 30 foot-candles (ft-c), while the first predetermined target lighting level for an office space may be about 40 ft-c. The second predetermined target lighting level for a warehouse environment can be between about 30 ft-c and about 15 ft-c, while the second predetermined target lighting level for an office space may be between about 40 ft-c and about 15 ft-c. The third predetermined target lighting level may be about 15 ft-c for both warehouse and office spaces.

It will be appreciated that the disclosed control technique may find use in areas such as office or warehouse areas where it may be desirable to maintain the lighting level in the area at a first, higher, level during working hours, at a second, lower level during the hour after work to enable people to get out of the workplace safely, followed by a third, even lower, value at night, on the weekends and holidays when the workplace is expected to be unoccupied.

The aforementioned predetermined target lighting levels may be based on time of day as estimated by the embodiment described in relation to FIGS. 1-4. Alternatively, time of day information may be provided by an external clocking source associated with the processor 25, provided by the BMS 42 via communications link 44.

As previously noted, the photodetector 24 and system 23 can be used in conjunction with an occupancy sensor, such as the occupancy sensor 1 described in relation to FIGS. 1 and 2.

In a further embodiment, an occupancy sensor, such as the occupancy sensor 1 described in relation to FIGS. 1-4 may include ambient light sensing capability and variable time of day functionality similar to that described in relation to the embodiment of FIG. 5. With such functionality, a photodetector associated with an occupancy sensor can be used to modify functionality of the occupancy sensor.

For example, a photodetector may be employed to "hold off" turning lights on, even when the occupancy sensor determines that an area is occupied, for cases in which the photosensor (or an associated processor) determines that ambient lighting levels due to natural light in the area are above a predetermined threshold. In some cases this predetermined threshold may be a lighting value deemed adequate for an individual to perform a particular activity in the associated space.

Recognizing that a desired threshold lighting level for a particular monitored area may change based on the time of day (for any or all of the reasons previously noted), this "hold off" functionality, as well as other functionality, may be modified based on the time of day.

As will be appreciated, different work areas may be associated with tasks requiring different levels of light (either for comfort or safety) during working hours as compared to non-working hours. For example, in a warehouse during working hours, areas may be occupied with employees moving a wide variety of materials for shipment or which have been received. In some cases this may include the use of manual or powered machinery (e.g., hand trucks, fork lifts) which, for safety reasons, require a relatively high lighting levels. After hours, the activity that required enhanced lighting levels may cease, but the area may still be used by employees passing through on their way out of the building at the end of the work day. Thus, in the after-hours period, natural daylight may provide adequate illumination to enable safe passage of the employees out of the building, and thus, there may be no need to turn the lights on during this time period, even where the occupancy sensor determines that the area is occupied.

Another example can involve open cubicle work areas. During working hours, relatively high lighting levels may be desired to enable workers to comfortably perform tasks. After hours, however, it may not be necessary to turn lights on in the area, as a few employees may pass through these unoccupied areas as they leave for the day. Thus, the lighting level at which the occupancy sensor will "hold off" turning on the lights can change for a particular area depending on the time of day and the kind of work being performed in the area.

To implement this functionality, a plurality of different predetermined lighting levels may be programmed into one or more of the photosensor, the occupancy sensor, and an associated processor. The predetermined lighting levels may also be stored in non-volatile memory associated with the processor. The predetermined lighting levels may be employed to customize the "hold off" operation of the occupancy sensor to ensure that the minimum required lighting level is maintained for an area, while also ensuring that lighting in excess of the minimum required level is not provided. As will be appreciated such a feature ensures a safe working light level while also minimizing energy consumption.

In one exemplary non-limiting embodiment, a first predetermined lighting level may be associated with normal working hours (e.g., 8:00 AM to 5:00 PM) and may require a higher level of ambient light (i.e., daylight) in order for the occupancy sensor to "hold off" energizing associated area lighting. A second predetermined lighting level may be associated with non-working hours (e.g., 5:00 PM to 8:00 AM, weekends, holidays) that may require a lower level of ambient light in order for the occupancy sensor to "hold off" energizing associated area lighting. One or more additional predetermined lighting levels (and predetermined hold-offs) may also be associated with other periods of time during the day (e.g., lunch time) and/or days of the week, holidays and the like.

The disclosure thus describes systems and methods for changing the functionality of occupancy and/or lighting systems based on the time of day. In some embodiments, the time of day is determined based on light levels sensed by an associated photodetector. In some embodiments, time of day determinations are used to modify daylighting targets or ambient light hold-offs.

Some embodiments of the disclosed device may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. By way of example, such a machine may include, but not limited to, any suitable processing platform, computing platform, computing device, processing device, computing system, processing system, computer, processor, or the like, and may be implemented using any suitable combination of hardware and/or software. The computer-readable medium or article may include, but not limited to, any suitable type of memory unit, memory device, memory article, memory medium, storage device, storage article, storage medium and/or storage unit, for example, memory (including, but not limited to, non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

The invention claimed is:

1. An occupancy sensor, comprising:
   an occupancy sensing element;
   a photodetector; and
   a processor coupled to the occupancy sensing element and the photodetector, the processor programmed to:
      (i) receive light signals from the photodetector;
      (ii) receive occupancy signals from the occupancy sensing element;
      (iii) place the occupancy sensor into at least one of a plurality of operating modes; and
      (iv) control an associated load based on the selected operating mode and the received occupancy signals;
   wherein the plurality of operating modes includes at least a first operating mode, a second operating mode, and a third operating mode,
   wherein in the first operating mode, the associated load is not energized regardless of whether the processor receives occupancy signals from the occupancy sensing element;
   wherein the second operating mode is associated with a first predetermined time period that is different than the first operating mode, the processor energizes the associated load for a first amount of time during the first predetermined time period when an occupancy signal from the occupancy sensing element is received; and
   wherein the third operating mode is associated with a second predetermined time period that is different than the first and second operating modes, the processor energizes the associated load for a second amount of time during the second predetermined time period when a received occupancy signal from the occupancy sensing element is received.

2. The occupancy sensor of claim 1, wherein the second operating mode includes a first target light level and the third operating mode has a second target light level, the second target light level being different than the first target light level.

3. The occupancy sensor of claim 2, wherein the processor energizes the associated load to ensure that a total light level during the first predetermined time period meets the first target light level, and energizes the associated load to ensure that the total light level during the second predetermined time period meets the second target light level.

4. The occupancy sensor of claim 1, wherein the processor energizes the associated load for a first amount of time during the first predetermined time period, and energizes the associated load for a second amount of time during the second predetermined time period.

5. The occupancy sensor of claim 1, wherein the first and second predetermined time periods are first and second times of a day, respectively.

6. The occupancy sensor of claim 1, wherein the first and second predetermined time periods are first and second days of a week, respectively.

7. The occupancy sensor of claim 1, further comprising a housing, the occupancy sensing element, the photodetector, and the processor being located within the housing.

8. The occupancy sensor of claim 1, further comprising memory associated with the processor, wherein the first and second predetermined time periods are stored in the memory.

9. The occupancy sensor of claim 1, wherein the first and second predetermined time periods are entered into the occupancy sensor via a user input device.

10. An occupancy sensor, comprising:
an occupancy sensing element;
a photodetector; and
a processor coupled to the occupancy sensing element and the photodetector, the processor programmed to:
  (i) receive light signals from the photodetector;
  (ii) receive occupancy signals from the occupancy sensing element;
  (iii) place the occupancy sensor into at least one of a plurality of operating modes; and
  (iv) control an associated load based on the selected operating mode and the received occupancy signals;
wherein the plurality of operating modes includes at least a first operating mode, a second operating mode, and a third operating mode,
wherein the first operating mode is associated with a first predetermined time period;
wherein the second operating mode is associated with a second predetermined time period that is different than the first predetermined time period, the processor energizes the associated load for a first amount of time during the second predetermined time period when an occupancy signal from the occupancy sensing element is received; and
wherein the third operating mode is associated with a third predetermined time period that is different than the first and second predetermined time periods, the processor energizes the associated load for a second amount of time during the third predetermined time period when a received occupancy signal from the occupancy sensing element is received.

11. The occupancy sensor of claim 10, wherein the processor does not energize the associated load during the first predetermined time period regardless of whether the processor receives occupancy signals from the occupancy sensing element.

12. The occupancy sensor of claim 10, wherein the first operating mode includes a first target light level, the second operating mode includes a second target light level, and the third operating mode includes a third target light level, the first, second and third target light level being different from one another.

13. The occupancy sensor of claim 12, wherein the processor energizes the associated load to ensure that a total light level during the first predetermined time period is equal to or greater than the first target light level, energizes the associated load to ensure that the total light level during the second predetermined time period is equal to or greater than the second target light level, and energizes the associated load to ensure that the total light level during the third predetermined time period is equal to or greater than the third target light level.

14. The occupancy sensor of claim 10, wherein the processor energizes the associated load for a first amount of time during the first predetermined time period, energizes the associated load for a second amount of time during the second predetermined time period, and energizes the associated load for a third amount of time during the third predetermined time period.

15. The occupancy sensor of claim 10, wherein the first, second, and third predetermined time periods are first, second, and third times of a day, respectively.

16. The occupancy sensor of claim 10, wherein the first, second, and third predetermined time periods are first, second, and third days of a week, respectively.

17. The occupancy sensor of claim 10, further comprising a housing, the occupancy sensing element, the photodetector, and the processor being located within the housing, the housing being configured to be mounted to a pole in an outdoor parking lot.

18. The occupancy sensor of claim 10, further comprising memory associated with the processor, wherein the first, second and third predetermined time periods are stored in the memory.

19. The occupancy sensor of claim 10, wherein the first, second, and third predetermined time periods are entered into the occupancy sensor via a user input device.

\* \* \* \* \*